US012627984B2

(12) United States Patent
Gibson et al.

(10) Patent No.: US 12,627,984 B2
(45) Date of Patent: May 12, 2026

(54) IDENTIFYING AND DISRUPTING DATA SESSIONS IN TELECOMMUNICATIONS NETWORKS

(71) Applicant: T-MOBILE INNOVATIONS LLC, Overland Park, KS (US)

(72) Inventors: Geoffrey Todd Gibson, Ben Wheeler, TX (US); Jeffrey Scott Simon, Jr., Issaquah, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 18/929,877

(22) Filed: Oct. 29, 2024

(65) Prior Publication Data

US 2026/0122500 A1     Apr. 30, 2026

(51) Int. Cl.
*H04W 12/122* (2021.01)

(52) U.S. Cl.
CPC ................................. *H04W 12/122* (2021.01)

(58) Field of Classification Search
CPC .................................................... H04W 12/122
See application file for complete search history.

(56) References Cited

U.S. PATENT DOCUMENTS

| | | | |
|---|---|---|---|
| 2012/0233694 A1* | 9/2012 | Baliga ................... | H04W 12/12 |
| | | | 726/23 |
| 2017/0346844 A1* | 11/2017 | Hentunen ........... | H04L 63/1425 |
| 2020/0053165 A1* | 2/2020 | Li ......................... | H04W 12/08 |
| 2021/0392159 A1* | 12/2021 | Killion ................ | H04L 61/4511 |
| 2022/0103588 A1* | 3/2022 | Shaw ................... | H04W 72/51 |
| 2025/0097341 A1* | 3/2025 | Singh ................. | H04W 12/122 |

* cited by examiner

*Primary Examiner* — Normin Abedin
(74) *Attorney, Agent, or Firm* — SHOOK & BACON L.L.P.

(57) ABSTRACT

Aspects herein provide systems, devices, methods, and media for terminating malicious data sessions within a telecommunication network. In aspects, various mechanisms are deployed to identify malware infected devices by monitoring and identifying malicious communications.

20 Claims, 3 Drawing Sheets

100

200

IDENTIFYING A FIRST NETWORK
ENTITY FOR A FIRST DATA SESSION — 210

IDENTIFYING A SECOND NETWORK
ENTITY FOR A SECOND DATA SESSION — 220

DETERMINING THAT THE FIRST
NETWORK ENTITY FOR THE FIRST
DATA SESSION IS A MALICIOUS
NETWORK ENTITY — 230

TERMINATING THE FIRST DATA
SESSION WITH THE UE WHILE
SIMULTANEOUSLY MAINTAINING THE
SECOND DATA SESSION WITH THE UE — 240

IDENTIFYING AND DISRUPTING DATA SESSIONS IN TELECOMMUNICATIONS NETWORKS

SUMMARY

A high-level overview of various aspects of the disclosure is provided here to offer an overview of the disclosure and to introduce a selection of concepts that are further described below in the detailed description section. This summary is not intended to identify key features or essential features of the claimed subject matter, nor is it intended to be used as an aid in isolation to determine the scope of the claimed subject matter.

Various aspects herein protect user devices and a telecommunications network from malware infected user equipment (UE). In aspects, malicious activity can be identified within the telecommunications network, and further, a packet data unit (PDU) session associated with the malicious activity can be terminated while simultaneously maintaining a connection with other existing PDU sessions for the UE determined to be infected with malware.

BRIEF DESCRIPTION OF THE DRAWINGS

Aspects are described in detail below with reference to the attached drawings figures, wherein.

DETAILED DESCRIPTION

Figure 1:
FIG. 1 depicts an example of a system environment, in accordance with one or more aspects.
Figure 1:
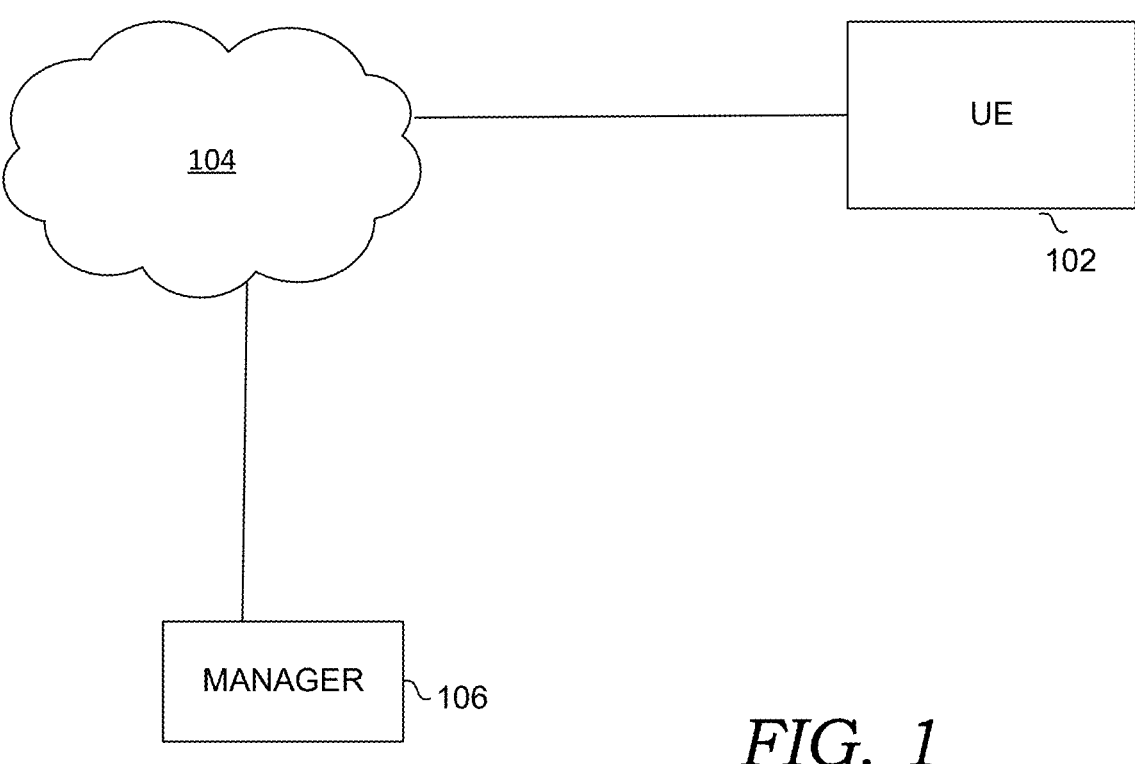

The subject matter of the present disclosure is being described with specificity herein to meet statutory requirements. However, the description itself is not intended to limit the scope of this patent. Rather, the inventors have contemplated that the claimed subject matter might also be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described. As such, although the terms "step" and/or "block" may be used herein to connote different elements of systems and/or methods, the terms should not be interpreted as implying any particular order and/or dependencies among or between various components and/or steps herein disclosed unless and except when the order of individual steps is explicitly described. The present disclosure will now be described more fully herein with reference to the accompanying drawings, which may not be drawn to scale and which are not to be construed as limiting. Indeed, the present disclosure can be embodied in many different forms and should not be construed as limited to the embodiments and aspects set forth herein.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present disclosure. The following is a list of these acronyms:

3G Third-Generation Wireless Access Technology
4G Fourth-Generation Wireless Access Technology
5G/5G NR Fifth-Generation Wireless Access Technology/New Radio
5GC Fifth-Generation Wireless Access Technology Core Network
AAU Active Antenna Unit
BRS Broadband Radio Service
CD-ROM Compact Disk Read-Only Memory
CDMA Code Division Multiple Access
CU Central Unit
DU Distribution Unit
EIRP Equivalent Isotropically Radiated Power
eNodeB Evolved Node B
EVDO Evolution-Data Optimized
GIS Geographic/Geographical/Geospatial Information System
gNodeB/gNB Next Generation Node B
gNB CU Next Generation Node B Central Unit
gNB DU Next Generation Node B Distribution Unit
GPRS General Packet Radio Service
GSM Global System for Mobile Communication
iDEN Integrated Digital Enhanced Network
DVD Digital Versatile Disc
EEPROM Electrically Erasable Programmable Read-Only Memory
FD-MIMO Full Dimension Multiple-Input Multiple-Output
IOT Internet of Things
IIOT Industry Internet of Things
IP Internet Protocol
LED Light Emitting Diode
LTE Long Term Evolution
MEC Mobile Far Edge Computer
MD Mobile Device
MIMO Multiple-Input Multiple-Output
mMIMO Massive Multiple-Input Multiple-Output
MMU Massive Multiple-Input Multiple-Output Unit
mm Wave Millimeter Wave
NEXRAD Next-Generation Radar
NR New Radio
OOBE Out-of-Band-Emission
OTN Optical Transport Network
PC Personal Computer
PCS Personal Communications Service
PDA Personal Digital Assistant
PLMN Public Land Mobile Network
PRB Physical Resource Block
vPRB Virtualized Physical Resource Block
RAN Radio Access Network
RAM Random Access Memory
RET Remote Electrical Tilt
RF Radio-Frequency
RF Radio-Frequency Interference
RIC Radio Intelligent Controller
RLF Radio Link Failure
R/N Relay Node
RNR Reverse Noise Rise
ROM Read-Only Memory
RRU Remote Radio Unit
RSRP Reference Signal Receive Power
RSRQ Reference Signal Receive Quality
RSSI Received Signal Strength Indicator
RU Radio Unit SINR Signal-to-Interference-&-Noise Ratio SNR Signal-to-Noise Ratio SON Self-Organizing Networks TDMA Time Division Multiple Access TXRU Transceiver (or Transceiver Unit)

UE User Equipment

UMTS Universal Mobile Telecommunications System

UTRAN UMTS Radio Access Network

E-UTRAN Evolved Universal Mobile Telecommunications System

WCD Wireless Communication Device (interchangeable with UE)

WLAN Wireless Local Area Network

XR Extended Reality

Further, various technical terms are used throughout this description. An illustrative resource that fleshes out various aspects of these terms can be found in *Newton's Telecom Dictionary,* 25th Edition (2009).

Aspects herein may be embodied as, among other things: a method, system, or set of instructions embodied on one or more computer-readable media. Aspects may take the form of a hardware aspect or an aspect combining software and hardware. Some aspects may take the form of a computer program product that includes computer-useable or computer-executable instructions embodied on one or more computer-readable media.

Definitions

"Computer-readable media" can be any available media and may include volatile and non-volatile media, as well as removable and non-removable media. By way of example, and not limitation, computer-readable media may include computer storage media and communication media. Computer-readable media may include both volatile and non-volatile media, removable and non-removable media, and may include media readable by a database, a switch, and various other network devices. Computer-readable media includes media implemented in any way for storing information. Examples of stored information include computer-useable instructions, data structures, program modules, and other data representations.

"Computer storage media" may include, without limitation, volatile and non-volatile media, as well as removable and non-removable media, implemented in any method or technology for the storage of information, such as computer-readable instructions, data structures, program modules, or other data. In this regard, computer storage media may include, but is not limited to, RAM, ROM, Electrically Erasable Programmable Read-Only Memory (EEPROM), flash memory or other memory technology, CD-ROM, DVD, holographic media, other optical disk storage, magnetic cassettes, magnetic tape, magnetic disk storage or other magnetic storage device, or any other medium that can be used to store the desired information and which may be accessed by the device 300 shown in FIG. 4. These technologies can store data momentarily, temporarily, or permanently.

"Communication media" may include, without limitation, computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner so as to encode information in the signal. By way of example, and not limitation, communication media includes wired media such as a wired network or direct-wired connection, and wireless media such as acoustic, radio frequency (RF), infrared, and other wireless media. Combinations of any of the above may also be included within the scope of computer-readable media.

The term "application" refers to software, a computer program, and/or an application programming interface that may be run by executing, by a processor, computer-readable instructions stored on memory for running the software. Examples of applications include social media applications, word processing applications, gaming application, messaging applications, video-streaming applications, and more, for example, as run on user devices.

"Network" refers to a network comprised of wireless and wired components that provide wireless communications service coverage, for example, to one or more user devices. For example, the network may include one or more, or a plurality of, wireless networks, hardwired networks, telecommunications networks, peer-to-peer networks, distributed networks, and/or any combination thereof. The network may comprise one or more access points, one or more cell sites (i.e., managed by an access point), one or more structures such as cell towers (i.e., having an antenna) associated with each access point and/or cell site, a gateway, a backhaul data center, a server that connects two or more access points, a database, a power supply, sensors, and other components not discussed herein, in various aspects. Examples of a network include a telecommunications network (e.g., 3G, 4G, 5G, future generations such as 6G, CDMA, CDMA 1XA, GPRS, EVDO, TDMA, GSM, LTE, and/or LTE Advanced) and/or a satellite network (e.g., Low Earth Orbit [LEO], Medium Earth Orbit [MEO], or geostationary). Additional examples of a network include a wide area network (WAN), a local area network (LAN), a metropolitan area network (MAN), a wide area local network (WLAN), a personal area network (PAN), a campus-wide network (CAN), a storage area network (SAN), a virtual private network (VPN), an enterprise private network (EPN), a home area network (HAN), a Wi-Fi network, a Worldwide Interoperability for Microwave Access (WiMAX) network, and/or an ad hoc (mesh) network. The network may include or may communicate with a physical location component for determining a geographic location of an item, package, parcel, personnel, vehicle, end-point location, etc., by leveraging, for example, a Global Positioning System (GPS), Global'naya Navigatsionnaya Sputnikovaya Sistema (GLONASS), BeiDou Navigation Satellite System (BDS), Global Navigation Satellite System (GNSS or "Galileo"), an indoor position system (IPS), or other positioning systems that leverage non-GPS signals or networks (e.g., signals of opportunity [SOP]).

"Access point" and "base station" are used interchangeably herein to reference hardware, software, devices, or other components for a communications device or structure having an antenna, an antenna array, a radio, a transceiver, and/or a controller. An access point can be deployed terrestrially at or near the Earth's surface, or within the atmosphere, for example, to orbit the Earth. For example, an "aerospace access point" may be a satellite deployed to orbit the Earth within or above the atmosphere (e.g., in the thermosphere or exosphere), whereas a "terrestrial access point" may be a fixed or semi-fixed base station located on the Earth's surface or upon any structure located on the surface. As discussed herein, an access point is a device comprised of hardware and complex software that is deployed in a network so that the access point can control and facilitate, via one or more antennas or antenna arrays, the broadcast, transmission, synchronization, and receipt of wireless signals in order to communicate with, verify, authenticate, and provide wireless communications service coverage to one or more user devices that request to join and/or are connected to the network. Generally, an access point can communicate directly with one or more user devices according to one or more access technologies (e.g., 3G, 4G, LTE, 5G, and mMIMO). An example of an aerospace access point includes a satellite. Examples of a terrestrial access point include a base station, an eNodeB, a gNodeB, a macro-cell, a small cell, a microcell, a femtocell, a picocell, and/or a computing device capable of acting as a wireless "hotspot" that enables connectivity to the network. Accordingly, the scale and coverage area of various types of access points are not limited to the examples discussed. Access points may work alone or in concert with one another, locally or remotely.

"Cell site" is generally used herein to refer to a defined wireless communications coverage area (i.e., a geographic area) serviced by an access point or a plurality of neighboring access points working together to provide a single coverage area. Also, it will be understood that one access point may control one cell site/coverage area, or, alternatively, one access point may control multiple cell sites/ coverage areas.

"User equipment" (UE), "user device," "mobile device," and "wireless communication device" are used interchangeably to refer to a device having hardware and software that is employed by a user in order to send and/or receive electronic signals/communication over one or more networks, whether terrestrial or aerospace. User devices generally include one or more antennas coupled to a radio for exchanging (e.g., transmitting and receiving) transmissions with an in-range base station that also has an antenna or antenna array. In aspects, user devices may constitute any variety of devices, such as a personal computer, a laptop computer, a tablet, a netbook, a mobile phone, a smartphone, a personal digital assistant, a wearable device, a fitness tracker, an unmanned aerial vehicle, industrial control system, security cameras, manufacturing equipment, autonomous driving vehicle, or any other device capable of communicating using one or more resources of the network. User devices may include components such as software and hardware, a processor, a memory, a display component, a power supply or power source, a speaker, a touch-input component, a keyboard, and the like. In various examples or scenarios that may be discussed herein, user devices may be capable of using 5G technologies with or without backward compatibility to prior access technologies, although the term is not limited so as to exclude legacy devices that are unable to utilize 5G technologies, for example.

The terms "radio," "controller," "antenna," and "antenna array" are used interchangeably herein to refer to one or more software and hardware components that facilitate sending and receiving wireless radio frequency signals, for example, based on instructions from a base station. A radio may be used to initiate and generate information that is then sent out through the antenna array, for example, where the radio and antenna array may be connected by one or more physical paths. Generally, an antenna array comprises a plurality of individual antenna elements. The antennas discussed herein may be dipole antennas having a length, for example, of ¼, ½, 1, or 1½ wavelengths. The antennas may be monopole, loop, parabolic, traveling-wave, aperture, Yagi-Uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

A "resolver" refers to a particular type of server that is configured to initiate and sequence various queries in order to obtain a 'resolution' or translation sought by the queries. For example, a resolver may initiate and sequence queries to other servers in order to translate a domain name into an IP address to aid in identifying a malware infected UE. A resolver may initiate and use queries using recursive, non-recursive, and/or iterative behaviors.

The term "nameserver" refers to a particular type of server of that is configured to respond to queries from a resolver-type server. A nameserver may access, references, organize, and/or modify a plurality of records, such as domain name system records. When a query is received by a nameserver, the nameserver can utilize the query to locate one or more records and communicate those records (or data from within the record) to a resolver-type server. For example, the nameserver may store and maintain associations between domain names and corresponding IP addresses.

A "domain name service response policy zone" (DNS RPZ) refers to a computerized mechanism or logic that enables customization of actions, functions, and operating parameters in a domain name system servers. In various aspects, a DNS RPZ operates to control the information that a query from a resolver is permitted to search for and/or "look up." For example a DNS RPZ may be used to define one or more domain names or IP addresses that are not permitted to be returned to a resolver (and further, to a user device) based on a request for that a domain name. In other words, if the domain name or IP address is indicated as malicious or not a trusted identifier, the IP address cannot be returned and, thus, a session is not initiated.

Additionally, it will be understood that sequential or relative terms such as "first," "second," "third," "primary," and/or "secondary" are used herein for the purposes of clarity in distinguishing between elements or features, but the terms are not used herein to import, imply, or otherwise limit the relevance, importance, quantity, technological functions, physical or temporal sequence, physical or temporal order, and/or operations of any element or feature unless specifically and explicitly stated as such.

Overview

Cybersecurity attacks (e.g., malware) are spreading annually and can consume large amounts of data for a single device or multiple devices. Malware infected devices may be used individually by a threat actor or as a group of infected devices in a botnet attack. Malware is known as any form of a malicious software that is present within a device which could include a virus, worm, trojans, spyware, browser hijacker, adware, ransomware, etc. For a mobile device that is limited to a specific amount of high-speed data monthly, malware can consume most of that monthly allotment of high-speed data in a short time period. If that data consumption is multiplied times potentially hundreds of thousands to millions of malware infected devices on a telecommunications network, the total aggregated data consumption across a mobile network operator's (MNOs) network could create negative network and user experiences.

Additionally, additional data consumption by malware infected UEs consumes more electric power from the power grid. The malware causes not only the UEs to consume more power (resulting in a shorter battery life for the UE) but also the cellular radios at a cell site and every router between the UE and a Command and Control (C2) server. In a time where the focus on sustainable energy is increasing, malware is disturbing sustainable efforts by causing exponentially more energy usage than is required.

Aspects herein provide a solution, using malware detection tooling, to allow a MNO to terminate a packet data unit (PDU) session that is being used for malware communications while simultaneously maintaining other PDU sessions not associated with the malware communications. For example, if traffic is detected to originate from an infected UE, destined to a known C2 server, directed to the MNO's infrastructure, or any other network entity (e.g., server, network gateway, load balancer, DNS, network function, API) associated with malicious activity via packet inspection, for example, a MNO could execute logic (e.g., scripts) that terminate the session (e.g., API session) between the potentially infected UE and the known malicious entity (e.g., the C2 server) and/or targeted non-malicious entity (e.g., network gateway). Non-malicious entities could be lucrative targets for the threat actor as the disruption of function for these entities could create a disruption and/or degradation of voice, messaging, and/or data services which could impact the MNO's network and the delivered service to potentially hundreds of millions of subscribers. Terminating the session can help to reduce total data consumption by the malware infected UE and help reduce the broader potential service impacts to the MNO. In other aspects, a PDU session may not even be initiated if the PDU session request is identified as directed to a known malicious entity (e.g., a C2 server). In this example, a packet data gateway may comprise intelligence to inspect the PDU session request before it is accessed by the MNO. In this way, an "API session" refers generally to a connection established between a client/UE and a server through an Application Programming Interface (API) while a "PDU session" refers generally to a network connection concept in 5G that represents a data flow between a UE and a data network. Additionally, if a UE has been identified as a chronic abuser, then all PDU sessions for the UE could be blocked. Both sessions are within the scope of aspects herein as the network can terminate both when associated with malicious entities.

Beginning with FIG. 1, a system 100 for disrupting malicious communications for a malware infected device within a telecommunications network is provided. The system 100 can include, for example, user equipment 102, as well as a manager 106 operating within or as part of a telecommunications network 104.

In aspects, the manager 106 may comprise or be in communication with a packet data unit (PDU) gateway (not shown) configured to identify malware-infected devices. In other aspects, the manager 106 may comprise or be in communication with one or more servers (not shown) that include one or more processors and access to a memory. The servers can be communicatively coupled to the telecommunications network 104, in order to perform specially configured functions and/or to operate at the edge, mid-haul, or backhaul architecture of the telecommunications network 104. The servers may comprise a physical server (e.g., located in a data center), a virtual server, a cloud-based server, be embedded within other network functions (e.g., User Plane Function (UPF), router, switch) or operate as distributed across one or more thereof. In aspects, one or more of the servers may represent servers of the same or different types. For example the servers may represent a plurality of servers that include a root server, a top level domain server, an authoritative nameserver, or any combination thereof.

In aspects, the manager 106 (or servers associated therewith) can identify whether communications are associated with malicious intent and/or if a device is infected with malware. For instance, a Domain Name System (DNS) query can be submitted from a UE and the manager 106 may determine the IP address associated with the domain name designated in the request. In some aspects, the domain name in the request may be malicious, for example, a malicious web page, a redirection that triggers the installation of malware, and/or a malicious cyberattack mechanism. Of course, the malicious nature of the content to be retrieved using the domain name is generally unknown to the user of the user device. As such, the unsuspecting user of the user device may be seeking to navigate to a domain that is malicious to their detriment. The UE and/or multiple UEs (e.g., IoT devices) may have been infected with malware in the software supply chain via firmware software, operating system software, driver software, over the top (OTT) software, etc.

By way of further example, a UE can be determined to be infected with malware if ingress/egress communications are identified to be originating from/directed to a C2 server. C2 servers are known to be used by malicious entities to control and coordinate their malicious activities. Specifically, C2 servers are known to be used to send commands to malware and further distribute malicious programs. Thus, a UE is likely malware infected when a volume/frequency of communication with a C2 server is above a predetermined threshold. More generally, the UE can be determined to be malware infected if a data stream is associated with malicious activity, as further described below. In order to monitor malicious activity, various safeguards can be utilized. In aspects, a PDU session request can be analyzed to identify a destination (e.g., a C2 server). In further aspects, a DNS query as part of a PDU session request can be evaluated to identify if an IP address associated with the domain is associated with malicious activity. As another example, a UE may be infected with a zero day malware software that does not communicate with a C2 server so that it can obfuscate itself from the manager 106. A zero day attack could be detected by the manager 106 by means of artificial intelligence, machine learning, behavioral analytics, etc. which it could terminate a single PDU session, multiple PDU sessions, and/or all PDU sessions from the infected UE devices.

To this end, the manager 106 may further comprise or be in communication with a resolver (not shown), in aspects. In some aspects, the resolver is a particular type of server. In one aspect, the resolver utilized herein is a recursive resolver. In various aspects, the manager 106 and/or the resolver hosts an application using one or more processors. The application can receive a request comprised of a domain name, for example, via a DNS query from a user device as part of a PDU session request.

Aspects herein are capable of disrupting or terminating data sessions for a malware infected UE at the telecommunications network level while simultaneously maintaining one or more other data sessions with the malware infected UE. Malicious traffic, as used herein, refers generally to any network activity designed to harm the network and, thus, may be blocked in aspects herein. Terminating data sessions of UEs is provided in aspects, such that the malware itself is determined to be present on the UE and specific data sessions associated therewith are terminated while maintaining connections with other data sessions not associated with the malware. Malware is a component of malicious traffic and a specific focus of some aspects herein where particular data sessions are targeted for termination at the network level. Furthermore, UEs are capable of having multiple data sessions on a network. For instance, multiple data sessions may be established to access different data streams independently at the same time, such as for streaming video, browsing the web, sending messages, etc., while each is associated with a different quality of service requirement. Thus, it would be undesirable for both the network and the user to terminate all of the data sessions for the UE when malicious activity is identified unless the MNO has determined that the UE is used solely for malicious activities. Commonly, the UE will operate normally but for the malicious data session and can continue to remain on the network and continue current data sessions by only terminating the affected data session (i.e., the data session identified to be malicious).

Aspects herein are capable of disrupting malicious traffic and terminating malicious data sessions at the telecommunications network level, across a myriad of user devices in a near real-time up-to-date manner, using computer instruction and/or by leveraging a trained machine-learning model/artificial intelligence. As such, aspects herein can provide for intelligent early detection of malware infected devices and disrupt or interrupt them across the entirety of the telecommunications network-thus preventing attacks via those involved user device(s) and preventing spread to other user(s). The manager 106 may incorporate machine learning, threat intelligence data, known vulnerabilities (e.g., CVEs), deep packet inspection, network traffic signatures, etc. to assist with the identification and detection of malicious traffic.

For example, a machine learning model may be trained using data and information such as DNS logs, user account records, call detail records, data usage and consumption information, time of data access information, location information, movement information, user device measurement reports, port tap packet captures, packet data gateway logs, and the like. The machine learning model may comprise a clustering algorithm, and may be trained in a supervised, unsupervised, or hybrid manner. As such, the machine learning model may be trained using near real-time data obtained in an on-going manner until the output of the machine learning model reaches a threshold for accuracy. Subsequently, malicious traffic via malicious data sessions for malware infected devices at the telecommunications network level can be identified and disrupted, by the manager 106, as leveraging a trained machine learning model.

For example, location information and/or movement information may be used to identify whether a user device is remaining stationary (e.g., absence of a handover). In one example, DNS logs may be used to determine whether a user device is attempting to resolve domain names that are known to be malicious. In an example, user account records, call detail records, data usage and consumption information, time of data access information, or any combination thereof, could be used to determine that a new user account was created within a defined period (e.g., past 24 hours) and is operating outside predetermined or learned normal ranges compared to other user accounts and/or other user devices. Port taps packet captures and/or packet data gateway logs may be used to perform deep packet inspection and further, to determine and recognize behavior that deviates from averages or trends in other user account and/or other use devices, for example, by the manager 106. Packet data gateway logs may be used to identify a destination of data sessions to determine if the destination is associated with a malicious status. In aspects, the machine learning model may continue to ingest data to improve detection of malicious traffic or malware infected devices, via the manager 106.

In some aspects, a machine-learning model may capture information and provide the information to the manager 106, such as a Mobile Station International Subscriber Directory Number (MSISDN), an International Mobile Subscriber Identity (IMSI), a Subscription Permanent Identifier (SUPI), an International Mobile Equipment Identity (IMEI), or other unique identifier. Additionally, the machine-learning model may capture details and/or information about the device such as, for example, a timestamp, volume of data consumption, age of account (e.g., in hours, days), whether the device attempted to access a known malicious site or domain, whether the device is communicating with a C2 server, whether the device is associated with a particular location (e.g., device has been connected to the same cell site sector for n hours and/or n days), and/or any movement (e.g., is stationary, is presently moving), or the like. This information may be ingested and used for future recognition and/or predictions (e.g., detections) of malware, and/or a malicious cyberattack mechanism.

It will be understood by those of ordinary skill in the art that the environment is just one example of a suitable environment for implementing systems, media, and methods described herein that is not intended to limit the scope of use or functionality of the present invention. The example environment is simplified to illustrate devices, components, and modules in merely one of many suitable configurations and arrangements, such that configurations and arrangements of devices, components, and modules relative to one another, as well as the and the quantity of each of the devices, components, and modules, can vary from what is depicted (e.g., devices, components, and modules may be omitted and/or could be greater in quantity than shown). As such, the absence of components from FIG. 1 should be not be interpreted as limiting the present invention to exclude additional components and combination(s) of components. Similarly, the system 100 should not be interpreted as imputing any dependency between devices, components, and modules, and nor imputing any requirements with regard to each of the devices, components, modules, and combination(s) of such, as illustrated in FIG. 1. Also, it will be appreciated by those having ordinary skill in the art that the connections illustrated in FIG. 1 are also exemplary as other methods, hardware, software, and devices for establishing a communications link between the components, devices, systems, and entities, as shown in FIG. 1, may be utilized in implementation of the present invention. Although the connections are depicted using one or more solid lines, it will be understood by those having ordinary skill in the art that the exemplary connections of FIG. 1 may be hardwired or wireless, and may use intermediary components that have been omitted or not included in FIG. 1 for simplicity's sake.

Figure 2:
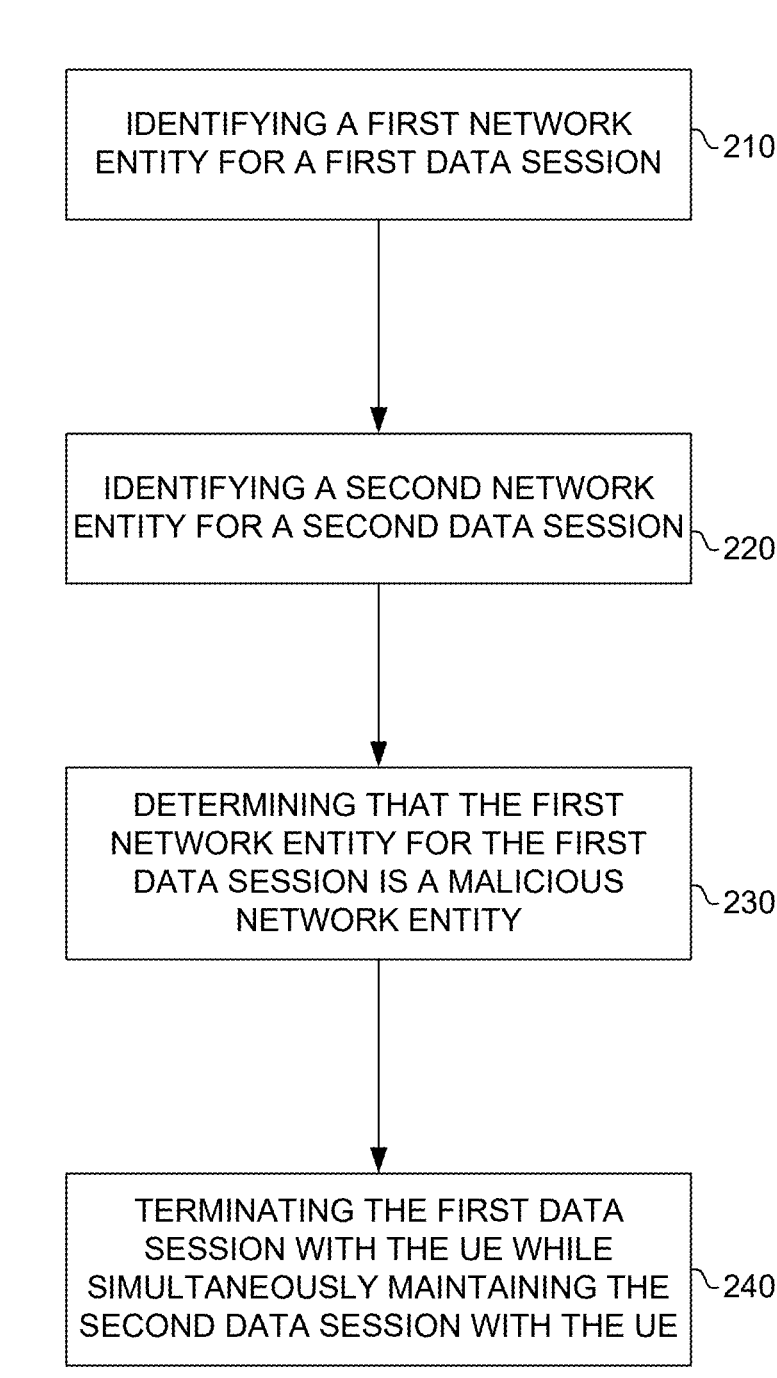
FIG. 2 depicts a flowchart of a method in accordance with one or more aspects.

Continuing to FIG. 2, methods are discussed that can be performed via one or more of the components and component interactions previously described in FIG. 1. As such, the methods are discussed briefly for brevity, though it will be understood that the previous discussion and details described therein can be applicable to aspect of the methods. Additionally or alternatively, it will be understood that the methods discussed herein can be implemented or performed via the execution of computer-readable instructions stored on computer readable media, by one or more processors.

FIG. 2 provides a flowchart of a method 200 of a computerized method to be performed via one or more of the components of FIG. 1. The method 200 may be performed, for example, using an application as discussed with regard to FIG. 1. In aspects, such an application may be run or hosted by, in its entirety or in part (distributed) by the manager 106 and/or other servers, computing devices, hardware, and/or software, whether physical, virtual, or cloud-based. At block 210, a first network entity for a first data session with a UE is identified. At block 220, a second network entity for a second data session with the UE is identified. It is determined, at block 230, that the first network entity for the first data session is a malicious network entity. The first data session is terminated at block 240 while simultaneously maintaining the second data session with the UE. In aspects, the network entity is a server. In further aspects, the malicious network entity is a C2 server. The network entity, in aspects, may be a server, a network gateway, a load balancer, a DNS, a network function, an API, and the like.

In aspects, the manager 106 may determine whether the data session is associated with malicious activity without human input or manual interactions, as further discussed. When the data session is determined to be associated with malicious activity, the telecommunication network may be leveraged by a mobile network operator to implement notifications, alerts, updates, and more, for example, to prevent spread of the malicious activity to particular users across the telecommunications network. In aspects, the data session is terminated upon association with malicious activity, while other data sessions with the same UE are maintained. Additionally, a mobile network operator may, via the telecommunications network, block servers, IP addresses or domains associated with malicious activities, while also being able to diagnose or identify user devices in the telecommunications network that may be compromised by a malicious entity. In one example, the mobile network operator may automatically notify one or more users of a possible malicious "infection" or exposure to malware, for example, where the one or more users have initiated a PDU session request that is associated with a malicious entity (e.g., a C2 server). In another example, the mobile network operator may automatically notify one or more end-points of the malicious IP address. In yet another example, the mobile network operator may automatically schedule an over-the-air firmware and/or software update to address, cure, or remove the malware, at the one or more user devices infected with the malware. In one example, the mobile network operator may automatically update one or more network security controls so as to result in blocking the malicious traffic at the telecommunications network.

In various aspects, a resolver or another server determines whether the UE is infected with malware based on, for example, a domain name service response policy zone (DNS RPZ). In one such example, the DNS RPZ specifies a plurality of IP addresses that are associated with malicious activity as determined using data traffic from the telecommunication network. Examples of malicious activity include a distributed denial-of-service (DDoS) type attacks, communication with a C2 server, NXDOMAIN attack (i.e., a domain is non-existent), DNS rebinding attack, cache poisoning, distributed reflection denial-of-service attack, DNS Tunneling, DNS Tunneling, a random subdomain attack, a Transmission Control Protocol Synchronize (TCP SYN) flood attack, a domain lock-up attack, and the like.

In another example, a resolver or another server determines whether the UE is infected with malware based on whether a threshold-exceeding volume of data traffic is identified within a particular time period. In one such example, the threshold-exceeding volume of data traffic indicates that the IP address is predicted to correspond to domain theft.

In one example, a resolver or another server determines whether the UE is infected with malware by querying a database. The database may be updated in near real-time using data traffic and/or analytics from the telecommunications network, such that the database stores a plurality of IP addresses that are associated with malicious activity in the data traffic. Lists of known C2 servers IP addresses are often stored and shared through threat intelligence feeds to help identify threats. In such an example, a resolver or another server determines that the IP address is associated with malicious activity when there is a match in the database. In some aspects, the database may store information regarding Common Vulnerabilities and Exposures (CVEs) and/or Coordinated Vulnerabilities Disclosures (CVDs).

In another example, a resolver or another server may identify one or more patterns in data traffic from the telecommunications network that are indicators of a phishing campaign. Using the patterns identified, a resolver or another server may update a database in order to store the one or more patterns identified. As such, the database can be utilized by a resolver or another server when subsequently determining whether an IP address is associated with malicious activity. In other words, a resolver or another server may determine that an IP address is associated with malicious activity when the IP address is associated with the one or more patterns identified. The patterns may be identified and updated in near real-time, using data traffic across the telecommunication network. Patterns may corresponds to specific instances of metadata, for example, of SMS activity.

In some aspects, a resolver or another server may identify, in near real-time, pattern(s) in data traffic that are markers of malicious activity, specifically based on a concurrent occurrence of one or more of: a particular geographic area or geographic area, a particular date and time, a particular key word, a particular special character, or a particular host name. A resolver or another server may update a database in order to store the pattern(s) identified for subsequent malicious activity determinations. Then, when an IP address is associated with the pattern(s), a resolver or another server may determine that the IP address is malicious. In the event the communication is designated to a C2 server, the UE can be determined to be infected with malware.

In further aspects, a resolver or another server may identify one or more patterns in data traffic from the telecommunications network that are indicators of a DDoS attack. The resolver or another server may update a database based on the identified pattern(s), and then determine those requests for IP addresses are malicious when matching the pattern(s) that are indicative of a DDoS attack, for example. As such, patterns of malicious activity can be identified and learned using data traffic across the telecommunication network, and used to update a database that is leveraged by resolvers across the telecommunication network, for a plurality of user devices. This improves the cybersecurity and safety of the telecommunication network itself to prevent infiltration and spread of malware, for example, and protects user devices operating within the telecommunication network in near real-time from new and evolving malicious attacks.

In an example, when the IP address is determined to be associated with malicious activity, a resolver or another server may select a plurality of user devices that are associated with one or more of: particular geographic area, a particular device type, or a particular demographic. Then, a notification may be communicated to the plurality of user devices that are selected, the notification specifying that the domain name is associated with malicious activity.

In further aspects, a mobile network operator may, via the resolver, identify one or more user devices that are likely to be infected or have been exposed to a malicious entity, for example, based on user device-specific data traffic and/or one or more patterns in the data traffic. In such an example, the mobile network operator may communicate a notification to a user device that is likely to be infected or have been exposed to a malicious entity, may schedule a firmware and/or software update for the user device to cure the infection (e.g., remove malware), to communicate a notification to a third party (e.g., a security vendor) with an update based on the malicious entity and associate data traffic, to update the knowledge of malicious entities and IP addresses for a plurality of resolver across the telecommunications network, or any combination thereof.

Figure 3:
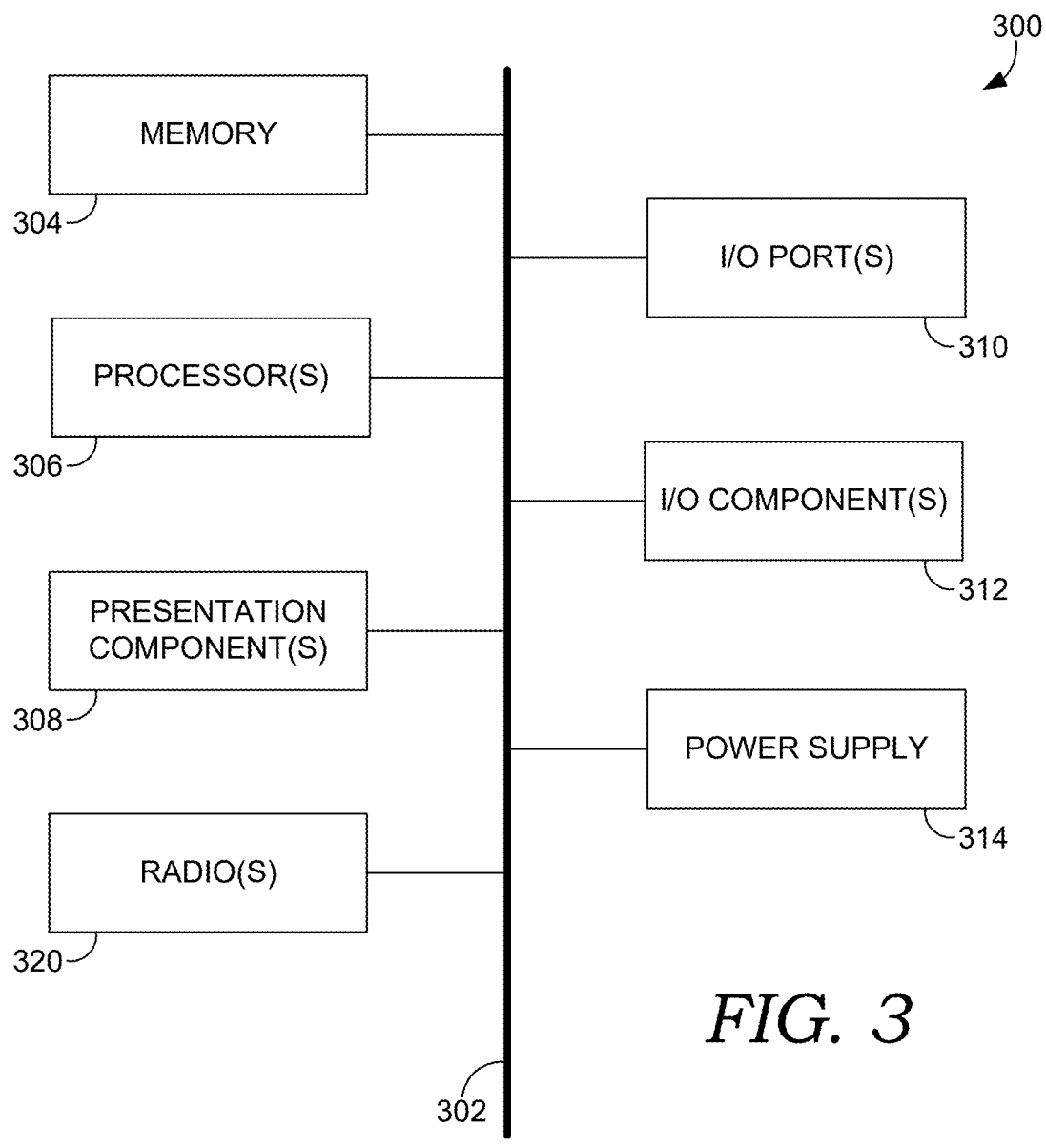
FIG. 3 depicts a simplified block diagram of an example device that is suitable for implementing one or more aspects discussed herein

Turning to FIG. 3, a diagram of an example device 300 that is suitable for use in implementations of aspects herein is provided. The device 300 is but one example of a suitable computing environment and is not intended to suggest any limitation as to the scope of use or functionality of the disclosure, and nor should the device 300 be interpreted as having any dependency or requirement relating to any one or combination of components illustrated.

The implementations of the present disclosure may be described in the general context of computer code or machine-useable instructions, including computer-executable instructions such as program components being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 3, the device 300 includes bus 302 that directly or indirectly couples with the following devices: memory 304, one or more processors 306, one or more presentation components 308, input/output (I/O) ports 310, I/O components 312, power supply 314, and radio(s) 320. Bus 302 represents what may be one or more buses (such as an address bus, data bus, or combination thereof). Although the devices of FIG. 3 are shown with lines for the sake of clarity, in reality, delineating various components is not so clear, and metaphorically, the lines would more accurately be grey and fuzzy. For example, one may consider a presentation component such as a display device to be one of I/O components 312. Also, processors, such as one or more processors 306, have memory. Distinction is not made between such categories as "workstation," "server," "laptop," "handheld device," "single board computers (SBCs)" etc., as all are contemplated within the scope of FIG. 3 and refer to "computer" or "computing device."

The device 300 typically includes a variety of computer-readable media. Computer-readable media can be any available media that can be accessed by the device 300 and includes both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information, such as computer-readable instructions, data structures, program modules, or other data.

Computer storage media includes RAM, ROM, EEPROM, flash memory or other memory technology, CD-ROM, digital versatile disks (DVDs) or other optical disk storage, magnetic cassettes, magnetic tape, and magnetic disk storage or other magnetic storage devices. Computer storage media does not comprise a propagated data signal.

Communication media typically embodies computer-readable instructions, data structures, program modules or other data in a modulated data signal (such as a carrier wave or other transport mechanism), and includes any information delivery media. The term "modulated data signal" indicates a signal that has one or more of its characteristics set or changed in such a manner so as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 304 includes computer storage media in the form of volatile and/or non-volatile memory. Memory 304 may be removable, non-removable, or a combination thereof. Examples of memory include solid-state memory, hard drives, optical disc drives, etc. The device 300 includes one or more processors 306, which read data from various entities such as bus 302, memory 304, or I/O components 312. One or more presentation components 308 present data indications to a person or other device. Examples of one or more presentation components 308 include a display device, speaker, printing component, vibrating component, etc. The I/O ports 310 allow the device 300 to be logically coupled to other devices including I/O components 312, some of which may be built into the device 300. The example I/O components 312 include a microphone, joystick, game pad, satellite dish, scanner, printer, wireless device, etc.

Radio 320 represents a radio that facilitates communication with a wireless telecommunications network. Illustrative wireless telecommunications technologies include CDMA, GPRS, TDMA, GSM, and the like. Radio 320 might additionally or alternatively facilitate other types of wireless communications including Wi-Fi, WiMAX, LTE, or other VOIP communications. As can be appreciated, in various aspects the radio 320 can be configured to support multiple technologies, and/or multiple radios can be utilized to support multiple technologies. A wireless telecommunications network might include an array of devices, which are not shown so as to not obscure more relevant aspects of the disclosure. Components such as a base station, a communications tower, or even access points (as well as other components) can provide wireless connectivity in some aspects.

Regarding FIGS. 1 through 3, it will be understood by those of ordinary skill in the art that the environment(s), system(s), and/or methods(s) depicted are not intended to limit the scope of use or functionality of the present aspects. Similarly, the environment(s), system(s), and/or methods(s) should not be interpreted as imputing any dependency and/or any requirements with regard to each component, each step, and combination(s) of components or step(s) illustrated therein. It will be appreciated by those having ordinary skill in the art that the connections illustrated in the figures are contemplated to potentially include methods, hardware, software, and/or other devices for establishing a communications link between the components, devices, systems, and/or entities, as may be utilized in implementation of the present aspects. As such, the absence of component(s) and/or steps(s) from the figures should not be interpreted as limiting the present aspects to exclude additional component(s) and/or combination(s) of components. Moreover, though devices and components in the figures may be represented as singular devices and/or components, it will be appreciated that some aspects can include a plurality of devices and/or components such that the figures should not be considered as limiting the number of a devices and/or components.

Many different arrangements of the various components depicted, as well as components not shown, are possible without departing from the scope of the claims below. Aspects of our technology have been described with the intent of being illustrative rather than restrictive. Alternative aspects will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A computerized method comprising:
identifying a first network entity for a first data session for a user equipment (UE);
identifying a second network entity for a second data session for the UE;
determining that the first network entity for the first data session is a malicious network entity;
terminating the first data session with the UE while simultaneously maintaining the second data session with the UE.

2. The computerized method of claim 1, wherein determining that the first network entity for the first data session is a malicious network entity comprises, based on a domain name service response policy zone (DNS RPZ), determining that an IP address of the malicious network entity is associated with malicious activity, wherein the DNS RPZ specifies a plurality of IP addresses that are associated with malicious activity as determined using data traffic from a telecommunications network.

3. The computerized method of claim 1, wherein determining that the first network entity is a malicious network entity comprises determining whether an IP address of the first network entity is associated with a threshold-exceeding volume of data traffic within a particular time period.

4. The computerized method of claim 1, wherein determining whether the first network entity is a malicious network entity comprises:
querying a database that is updated in near real-time using data traffic from the telecommunications network, wherein the database stores a plurality of network entity identities that are associated with malicious activity; and
determining that the first network entity is associated with malicious activity when there is a match in the database with the first network entity and a first network entity identifier in the database.

5. The computerized method of claim 1, further comprising:
identifying one or more patterns in data traffic from the telecommunications network that are indicators of malicious activity;
updating a database to store the one or more patterns identified for subsequent malicious activity determinations; and
determining the first network entity is associated with malicious activity when the first network entity is associated with the one or more patterns.

6. The computerized method of claim 1, wherein the first network entity is a Command and Control (C2) server.

7. The computerized method of claim 1, further comprising:
receiving a packet data unit (PDU) session request;
identifying a network entity associated with the PDU request as a Command and Control (C2) server; and
denying the PDU session request.

8. The computerized method of claim 1, further comprising, when an IP address for the second network entity is determined to not be associated with malicious activity, communicating the IP address for the second network entity to the UE.

9. The computerized method of claim 1, further comprising, communicating a notification to the UE that indicates the first network entity is associated with malicious activity.

10. One or more non-transitory computer-readable media storing instructions that when executed via one or more processors perform a computerized method, the instructions stored on the non-transitory computer-readable media comprising:
via the one or more processors:
identifying a first network entity for a first data session for a user equipment (UE);
identifying a second network entity for a second data session for the UE;
determining that the first network entity for the first data session is a malicious network entity;
terminating the first data session with the UE while simultaneously maintaining the second data session with the UE.

11. The media of claim 10, further comprising receiving a packet data unit (PDU) session request.

12. The media of claim 11, wherein the PDU session request identifies a third network entity for a third data session, wherein the third network entity is a Command and Control (C2) server.

13. The media of claim 12, further comprising denying the PDU session request, such that the PDU session for the third network entity is not established.

14. The media of claim 10, wherein the first network entity for the first data session is a Command and Control (C2) server.

15. A system comprising:
one or more processors; and
computer memory storing computer-usable instructions that, when executed by the one or more processors, perform operations comprising:
identifying a first network entity for a first data session for a user equipment (UE);
identifying a second network entity for a second data session for the UE;
determining that the first network entity for the first data session is a malicious network entity;

terminating the first data session with the UE while simultaneously maintaining the second data session with the UE.

16. The system of claim 15, wherein the first network entity for the first data session is a Command and Control (C2) server.

17. The system of claim 15, wherein the operations further comprise:

identifying one or more patterns in telecommunications network data that are indicators of malicious activity;

updating a database to store the one or more patterns identified for subsequent malicious activity determinations; and determining the first network entity is associated with malicious activity when an IP address of the first network entity is associated with the one or more patterns.

18. The system of claim 15, wherein the operations further comprise, when the first network entity is determined to be associated with malicious activity:

selecting a plurality of user devices that are associated with one or more of: particular geographic area, a particular device type, or a particular user demographic; and communicating a notification to the plurality of user devices, the notification specifying a domain name of the first network entity is associated with malicious activity.

19. The system of claim 15, wherein the operations further comprise:

receiving a packet data unit (PDU) session request subsequent to terminating the first data session with the first network entity;

identifying an IP address for the PDU session request is associated with the first network entity; and denying the PDU session request.

20. The system of claim 19, wherein the operations further comprise blocking subsequent traffic for the IP address on the network.

* * * * *